June 10, 1969

E. M. AMIR ET AL 3,449,456

STARTUP PROCEDURE FOR ISOMERIZING POLYMETHYLBENZENE

Filed June 3, 1968

INVENTORS.
EMANUEL M. AMIR,
EDWARD F. WADLEY,
BY ROBERT D. WESSELHOFT,

ATTORNEY.

United States Patent Office 3,449,456
Patented June 10, 1969

3,449,456
STARTUP PROCEDURE OF ISOMERIZING POLYMETHYLBENZENE
Emanuel M. Amir, Edward F. Wadley, and Robert D. Wesselhoft, Baytown, Tex., assignors to Esso Research and Engineering Company
Continuation-in-part of application Ser. No. 604,853, Dec. 27, 1966. This application June 3, 1968, Ser. No. 734,043
Int. Cl. C07c 5/24, 5/30
U.S. Cl. 260—668                                21 Claims

ABSTRACT OF THE DISCLOSURE

Prior to isomerizing polymethylbenzene with a molybdenum-containing silica-alumina catalyst, the silica-alumina is impregnated with an aqueous solution of a soluble ammonia-molybdenum compound (such as ammonium molybdate) to provide a finished catalyst containing an effective amount of $MoO_3$ on a dry basis, dried and then treated with free hydrogen under conditions that the molybdenum compound is decomposed to form ammonia which is then removed, such as by venting the hydrogen on a once-through basis, contacting the product with water, solution in the isomerized product, or by feeding $H_2$ and hydrocarbons simultaneously and discarding at least a part of the vapors.

CROSS-REFERENCES TO RELATED APPLICATIONS

This application is a continuation-in-part of Ser. No. 604,853, filed Dec. 27, 1966, for E. M. Amir, E. F. Wadley, and R. D. Wesselhoft and entitled "Method of Isomerizing Polymethylbenzene" and contains subject matter common to an application, Ser. No. 604,789, filed Dec. 27, 1966, for E. M. Amir, entitled "Catalyst for Isomerization of Polymethylbenzene."

BACKGROUND OF THE INVENTION

Field of the invention

The present invention is directed to a startup procedure for isomerizing a polymethylbenzene in which a silica-alumina catalyst which has been impregnated with an aqueous solution of ammonia-molybdenum-containing compound is treated with hydrogen by heating said catalyst in the presence of hydrogen at said pressure to a temperature within the range from about 650° to no greater than 850° F. and maintaining said temperature in the presence of hydrogen for a sufficient length of time. This treatment results in the formation of ammonia which is removed. The heated catalyst is then contacted with a polymethylbenzene having from 2 to 4 methyl groups at an isomerization temperature within the range from about 500° to about 850° F. under isomerization conditions in the presence of hydrogen to form a selected isomer.

Description of the prior art

It has been known heretofore to isomerize polymethylbenzene such as xylenes to form selectively p-xylene. It has also been known to use various catalysts such as silica-alumina catalysts at elevated temperatures. However, it has not been known heretofore that effective isomerization may be achieved by treating a silica-alumina catalyst which has been impregnated with an aqueous solution of a soluble ammonia-molybdenum compound with hydrogen under conditions to form ammonia, at least a greater portion of which is removed, to obtain a catalyst which is effective for long periods of time in isomerizing polymethylbenzene.

Variables of the invention

The isomerization conditions include a pressure within the range from about 100 to about 700 p.s.i.g., a feed rate from about 0.1 to about 10 liquid v./v./hour, and a hydrogen to polymethylbenzene mole ratio within the range from about 2:1 to about 20:1, the isomerization temperature being selected to provide the lowest temperature within said range of isomerization temperatures consistent with production of a selected level of the selected isomer as determined by the relationship:

$$K_x = \frac{\text{percent selected isomer}}{\text{percent selected isomer} + \text{sum of the percent of other isomers}}$$

with the maximum theoretical value of $K_x$ being the thermodynamic equilibrium value of the selected isomer at said selected lowest temperature.

The polymethylbenzene which is employed as a feed to the present invention is a polymethylbenzene having from 2 to 4 methyl groups on the benzene ring and includes orthoxylene, metaxylene, and paraxylene, 1,2,4-trimethylbenzene, 1,3,5-trimethylbenzene, 1,2,3-trimethylbenzene, and the tetramethylbenzenes including 1,2,4,5-tetramethylbenzene, 1,2,3,5-tetramethylbenzene and 1,2,3,4-tetramethylbenzene.

A catalyst employed in the present invention is the catalyst described and claimed in the Amir application supra and is a silica-alumina catalyst impregnated with ammonium molybdate. This catalyst is preferably produced by subjecting shapes of silica-alumina containing from about 10% to about 75% by weight of alumina and about 25% to about 90% of silica and containing from about 3% to about 10% by weight molybdenum as $MoO_3$ on a dry basis to drying at a temperature below 650° F. for a time within the range from about one to about five hours. The shapes may preferably be heated to a temperature below about 950° F. before the shapes are impregnated with molybdenum as described in the Amir application supra.

In the method of the present invention, the catalyst must be activated by hydrogen treatment. This hydrogen treatment is conducted under conditions such that the ammonium molybdate impregnated silica-alumina catalyst such as described in the Amir application supra is decomposed during the activation treatment to form ammonia which is removed at least in part. For example, the ammonia which is formed by heating the catalyst in the presence of free hydrogen prior to isomerization may be removed by treating the hydrogen which contains the formed or liberated ammonia with water which is then discarded. The amount of water employed may range from about 60 to about 3000 gallons per million cu. ft. of hydrogen per hour. An amount of water equivalent to 900 gallons per hour per million cu. ft. of hydrogen is quote effective in reducing the formed ammonia to 0 to 100 p.p.m. Ordinarily, the formed ammonia may be reduced from several thousand parts per million (in one case over 2000 p.p.m.) to an amount within the range from about 0.5 to about 3 p.p.m.

The formed ammonia may also be adequately removed by treating the catalyst with hydrogen on a once-through basis for about 16 hours. Venting or purging a portion of the gases during recycle will also reduce the ammonia to acceptable limits, but a significantly longer time may be required.

The formed ammonia may also be removed by allowing it to dissolve in the isomerized product and removing it therewith or the feed and hydrogen may be charged over the catalyst simultaneously for 50 to 250 hours to effect removal of the formed ammonia.

The activation treatment is conducted at a pressure of at least 100 p.s.i.g. and a temperature in the range from about 650° to no greater than 850° F. at said pressure and temperature range for at least 16 hours. A preferred temperature range may be from about 725° to 850° F. The catalyst must not be exposed to temperatures in excess of 650° in the presence of air or hydrogen at pressures below 100 p.s.i.g. The pressures at which the catalyst is heated and maintained at these temperatures may range from 100 to 1000 p.s.i.g. The times employed may range from about 16 hours up to 100 hours, although the heating times may be greater than 100 hours if desired. Likewise, the catalyst may be heated for up to about 16 hours after decomposition and removal of formed ammonia and prior to injecting the feed.

BRIEF DESCRIPTION OF THE DRAWING

The present invention will be further illustrated by reference to the drawing in which.

DESCRIPTION OF THE PREFERRED MODES AND EMBODIMENTS WITH RESPECT TO THE DRAWINGS AND EXAMPLES

Figure 1:
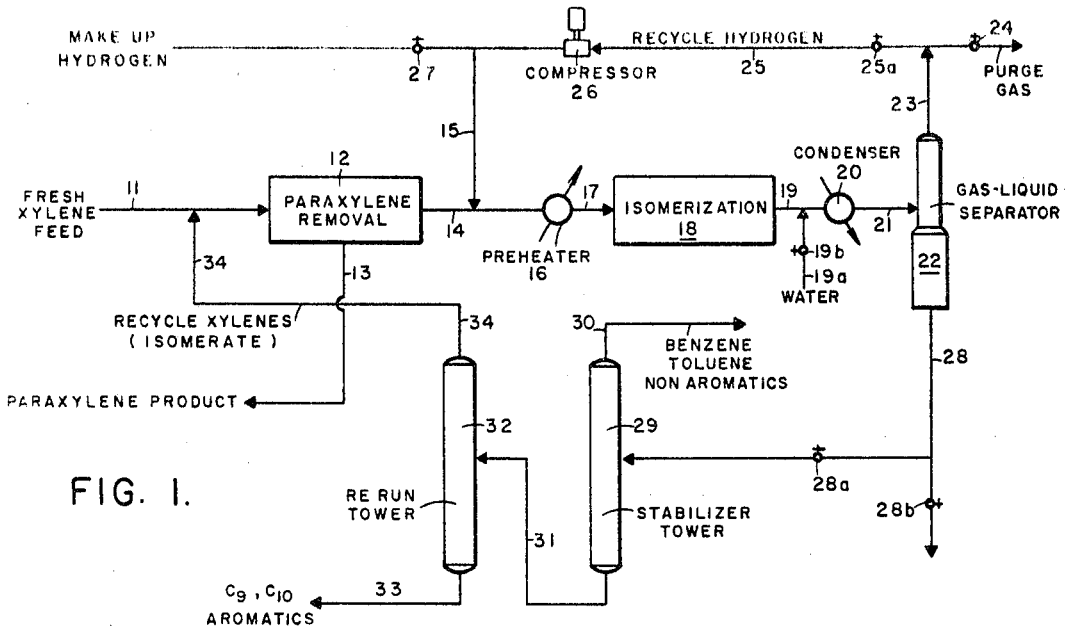
FIG. 1 is a flow diagram illustrating a best mode and embodiment contemplated.

Referring now to the drawing, and particularly to FIG. 1, numeral 11 designates a charge line by way of which a paraxylene-containing fraction boiling within the range from about 277° to about 291° F. obtained from a source not shown is introduced into a paraxylene removal zone 12 which suitably is a low-temperature crystallization zone wherein paraxylene is crystallized and removed as paraxylene crystals by way of line 13. Methods for removing paraxylene from fractions containing paraxylene are well known and, hence, further details thereof are not given. The filtrate from paraxylene removal zone 12 is discharged from zone 12 by line 14 and is admixed with hydrogen introduced by line 15 from a source which will be described further. The mixture of hydrogen and low paraxylene content feed is introduced into a preheating zone 16 wherein the temperature is raised to a temperature within the range from about 500° to about 850° F. and the heated mixture of hydrogen and feed is introduced by line 17 into an isomerization zone 18 which may comprise a vertical bed of silica-alumina molybdenum-containing isomerization catalyst where the feed stock is contacted with the catalyst under isomerization conditions in the presence of hydrogen introduced by line 15.

Prior to initiating the isomerization operation, it is necessary that the catalyst be treated to activate same and to this end the catalyst in isomerization zone 18, prior to starting the feed to zone 18, is pressured to at least 100 p.s.i.g., following which hydrogen is admitted and allowed to flow over the catalyst for a period of 4 to 24 hours until a temperature from about 700° to no greater than 850° F. is attained. Thereafter the temperatures are maintained at said temperature and said pressure for up to 16 hours and preferably a greater number of hours, from 24 to 100 hours. After 100 hours, the catalyst is completely activated. A greater period of activation may be used since no detrimental effects have been observed from over-activation. If the temperature exceeds 850° F., the catalyst is harmed by calcination which causes excessive disproportionation of the feed which the present invention avoids.

During the activation or hydrogen treatment, ammonia is formed and removed. This may be accomplished by closing valve 25a in line 25 and allowing the gases and vapors to escape by line 25, valve 24 being opened. The formed ammonia may also be removed by charging the feed and hydrogen simultaneously and allowing the formed ammonia to dissolve in the isomerized product, in which event, the ammonia would be removed by line 30 as described further hereinafter. Preferably, however, water is added to line 19 by branch line 19a controlled by valve 19b and the formed ammonia dissolved out of the hydrogen into the water. In this case, valve 28a is closed and valve 28b is opened with the aqueous ammoniacal solution discarded from the system for further use as may be desired.

After the catalyst in isomerization zone 18 has been suitably activated as described or prior thereto, the feed introduced by line 17 flows therethrough and the xylene is isomerized to the selected isomer as controlled by the isomerization condition. The isomerized product is discharged from zone 18 by line 19 and passed through a cooler-condenser 20 and, thence, by line 21 into a gas-liquid separator 22 where a separation is made between a gas phase and a liquid phase. The gas phase containing hydrogen is discharged by line 23 and a portion thereof containing any ammonia may be vented from the system by opening valve 24 in line 25. Preferably, a major part of the gas from line 23 is recycled by line 25 containing compressor 26 to line 15 for reuse in the process. If insufficient hydrogen is obtained by line 23, make-up hydrogen may be introduced in line 15 by opening valve 27 connecting to an extraneous source of hydrogen not shown.

The liquid phase in separator 22 is withdrawn by line 28 with valve 28b closed and valve 28a opened and introduced thereby into a stabilizer zone 29 which suitably is a fractional distillation zone equipped with all auxiliary equipment such as vapor-liquid contacting means, heating means, cooling and condensing means, and the like, to provide a separation of lower boiling products from the selected isomer. In this instance a fraction containing benzene, toluene, nonaromatics, and any ammonia formed by decomposition, may be discharged from zone 29 by line 30 while a fraction containing paraxylene is discharged by line 31 and introduced thereby into a second fractional distillation tower 32 which may be designated a rerun zone which is similarly equipped to zone 29. A heavier fraction containing $C_9$ and $C_{10}$ aromatics may be discharged from zone 32 by line 33 while the desired product is withdrawn by line 34 which connects to line 11 which introduces same to paraxylene removal zone 12 from which the desired product is recovered by line 13.

It will be seen from the description taken with the drawing that the present invention provides a method for producing and recovering a selected isomer from a polymethylbenzene isomerized product. The feed introduced by line 11 may be a trimethylbenzene or a tetramethylbenzene as may be desired.

In order to illustrate the invention further, reference will now be made to FIG. 2 which is a plot of data wherein the extent of paraxylene production is illustrated by the following relationship:

$$K_x = \frac{\text{percent selected isomer}}{\text{percent selected isomer} + \text{sum of the percent of other isomers}}$$

Figure 2:
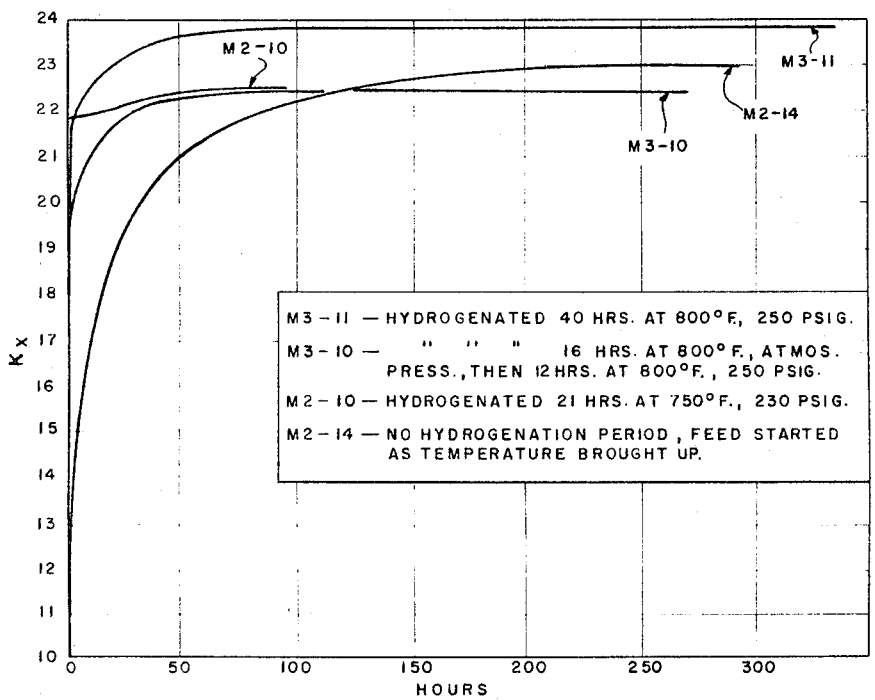
FIG. 2 is a plot of data illustrating the effect of hydrogen activation upon catalyst activity.

FIG. 2 shows the relationship where $K_x$ for paraxylene is plotted against the hours of operation. In run M3–11 where the catalyst was activated by heating for 40 hours in the presence of hydrogen at 800° F., the thermodynamic equilibrium ratio of nearly 24 was achieved at about 75 hours and maintained at this level up to over 300 hours. In run M2–14 there was no activation since the feed xylene was started as the temperature was brought up with hydrogen flow. It will be clear that a $K_x$ value of about 23 was achieved only after about 200 hours of operation. Run M3–10 illustrates an improper startup where the catalyst was subjected to hydrogen for 16 hours at 800° F. at atmospheric pressure then raised to 250 p.s.i.g. for 12 hours at 800° F. It will be noted that in run M3-10 the $K_x$ value was no greater than about 22.2, much lower than run M3-11. In run M2-10, the catalyst was subjected to hydrogen for 21 hours at 750° F. and 230 p.s.i.g. It will be noted that in run M2-10 again the $K_x$ value reached a level of about 22.3, much lower than run M3-11. In all cases in the foregoing runs illustrated in FIG. 2, the space velocity and the hydrogen-to-xylene mole ratio were identical. It will be clear that superior results were obtained in run M3-11 over any of the other runs and these superior results were maintained for a long operating time.

In order to illustrate the invention further, the following three examples are given to illustrate the importance of excluding air from the catalyst during the activation period:

Example 1.—A charge of catalyst was placed in the reactor and a slow stream of air passed through it while the temperature was slowly raised to 800° F. After three hours, the air was purged with nitrogen, then the catalyst was treated with hydrogen for 16 hours at 800° F. and 230 p.s.i.g. The temperature was reduced to 750° F., and xylene feed was then introduced at 1.0 v./v./hour and 7.2:1 mole $H_2$ per mole feed.

Example 2.—An identical catalyst charge was placed in the reactor, but it was not heated with air. The air present was displaced with nitrogen, then hydrogen was passed over the catalyst at 230 p.s.i.g. After one hour, the temperature was raised slowly to 800° F. and the catalyst was treated again with hydrogen for 16 hours. The temperature was reduced to 750° F., and the xylene feed was then introduced under the identical conditions of Example 1.

Example 3.—Catalyst was treated in an identical manner to Example 2 except that it was treated with hydrogen at 230 p.s.i.g. for an additional 96 hours at 750° F. The xylene feed was then introduced at 750° F.

The extent of paraxylene production as measured by $K_x$ $$\left(K_x = \frac{PX}{PX + MX + OX} \times 100\right)$$

p-XYLENE PRODUCTION, $K_x$, AFTER GIVEN HOURS ON STREAM

| | | $K_x$ at | |
|---|---|---|---|
| | 24 | 100 Hours | 170 |
| Example: | | | |
| 1 | 21.72 | 21.89 | 22.25 |
| 2 | 22.61 | 23.44 | 23.30 |
| 3 | 24.15 | 24.10 | 24.05 |

On comparing Examples 1 and 2, it was clear that where the catalyst was heated in the absence of air but in the presence of hydrogen, improved results were obtained over operating periods up to 170 hours. Much greater improvements were obtained, however, where longer hydrogen treatment was used as shown in Example 3. The length of time of hydrogen treatment depends on the temperature level.

It is important that the catalyst not be exposed to a temperature in excess of 650° F. in the presence of air or hydrogen with the pressure below 100 p.s.i.g., preferably 200 p.s.i.g. It is also important in the present invention to maintain the isomerization temperature at the 1 west temperature within the range given while producing a selected level of the selected isomer at maximum catalyst life as determined by the $K_x$ relationship given supra under the operating conditions which have been given herein.

The operating conditions are selected such that the selected isomer is produced in a selected amount, preferably just below its equilibrium level to extend the catalyst life to its maximum and to produce maximum amounts of the selected isomer and minimum amounts of by-products such as result from disproportionation reactions.

Important variables in the present invention are operating pressure, hydrogen to polymethylbenzene mole ratio, and space velocity. These variables are closely related and controlled by contact time and hydrogen partial pressure. These variables may be illustrated by the following 2 runs at greatly different conditions which have comparable contact times and similar conversions:

| | M3-13 | M1-3 |
|---|---|---|
| Run No.: | | |
| Hours on Catalyst | 140 | 140 |
| LHSV, v./v./Hr | 0.93 | 2.1 |
| $H_2$/H.D. Ratio | 8.5/1 | 6/1 |
| Pressure, p.s.i.g | 250 | 350 |
| Temperature, ° F | 750 | 750 |
| Apparent Contact Time, Sec | 16.3 | 19.7 |
| $K_x$ | 23.5 | 23.6 |
| Disproportionation | 7.0 | 8.2 |

In the practice of the present invention, it is desirable to employ the lowest temperature within the range of isomerization temperatures given which will give the desired $K_x$ values for the selected isomer at the selected lowest temperature. For paraxylene, this may be within the range from about 23 to about 24. Ultimate conversion to paraxylene is equilibrium limited since $K_x$ paraxylene is about 24.2 at 750° F. Hence, for paraxylene it is unnecessary to operate at more severe levels except in certain cases as will be discussed later herein. Operations below about 24, say in the neighborhood of 23 to 23.8, will insure that the operation for paraxylene is not too severe.

After proper activation of the catalyst, as has been described, the temperature is lowered with hydrogen flow over the catalyst. After an induction period, say for example about 200 to 250 hours on xylene feed, the catalyst activity will line out at its maximum. At this time the $K_x$ value may be determined to insure that it is in the proper range. The actual $K_x$ value will be a function of the particular catalyst activity, space velocity, $H_2$:polymethylbenzene ratio, pressure, hydrogen purity, temperature, and feed composition and the severity of the operation may be adjusted to give the desired $K_x$ value. The severity normally is adjusted by changing the pressure or the feed rate.

Figure 3:
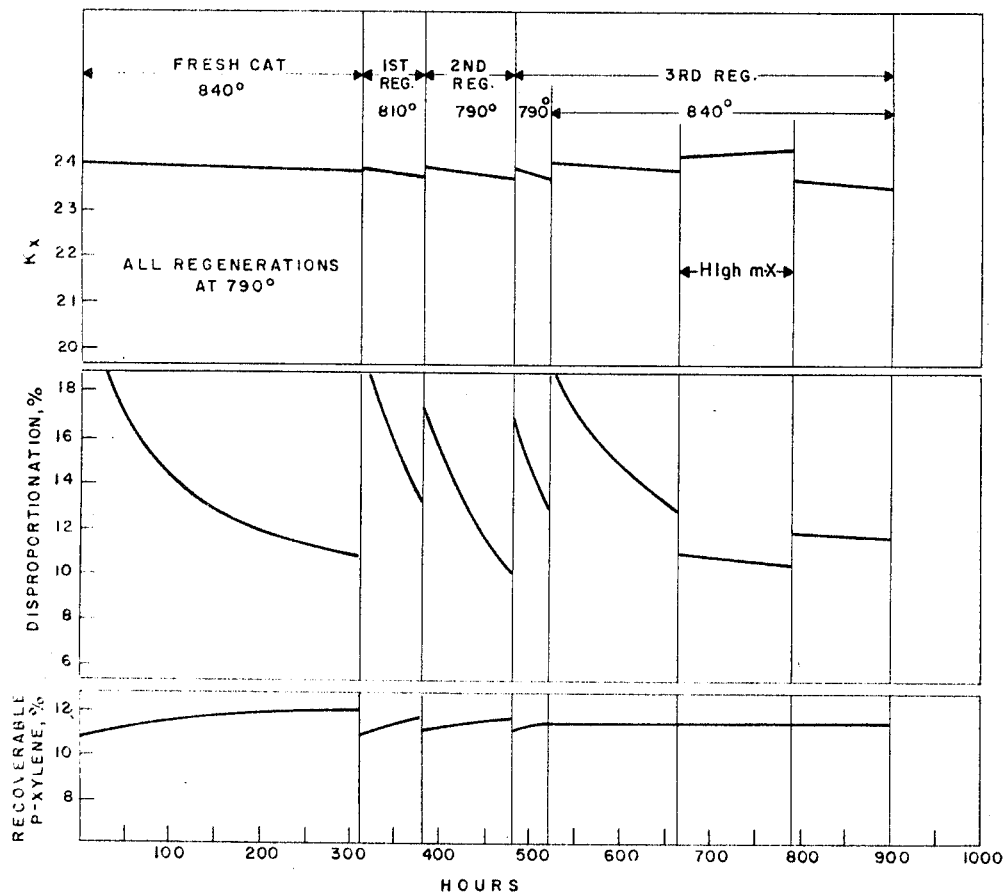
FIG. 3 is a plot of data showing the effects of regeneration.

As the activity of the catalyst slowly drops with time of operation, the temperature may be adjusted upward to maintain a desired $K_x$ value. Before reaching 850° F., however, the reaction should be stopped and the catalyst regenerated in order to avoid calcining and subsequent excessive disproportionation, as has been described supra. The catalyst may be regenerated by causing a mixture of 1% oxygen and nitrogen to flow over the mixture of catalyst at 750° F. followed by a repeat burning at 800° F., with complete restoration of catalyst performance. The catalyst should be cooled after regeneration and reactivated as has been described. Reference to FIG. 3 illustrates the effects of three regenerations on catalyst activity as illustrated by the $K_x$ value, disproportionation, and recoverable paraxylene in percent.

A novel aspect of the present invention is the low temperatures that are employed. In other words, with a molybdenum-containing silica-alumina catalyst, it is possible to operate at the low temperatures without the formation of large amounts of nonaromatics, although at the temperatures employed in the present invention equilibrium favors production of nonaromatics. Thus, an unobvious result is obtained.

The present invention has another desirable feature since it has been found that at high severities of operation disproportionation results. In a recycle operation such as described with respect to FIG. 1, where fresh xylene feed is fed to a paraxylene recovery zone, ethylbenzene in the feed may build up and act as an undesirable diluent. It has been found that the rate of disproportionation of ethylbenzene is higher than the rate of disproportionation of the xylene. Consequently, by operating at high severities the ethylbenzene may be removed at a rate equal to the xylene by disproportionation plus paraxylene product removal. Thus, the ethylbenzene may be kept in balance at a low level.

Feed composition is also important in the present invention since it has been found that this has a marked effect, particularly in the production of paraxylene as illustrated by the $K_x$ value. Feeds in which metaxylene is rich and orthoxylene is at thermodynamic equilibrium or below readily produce paraxylene at equilibrium ($K_x$=24.2). On the other hand, if orthoxylene is above equilibrium, much more severe operation is required to produce paraxylene at the selected $K_x$. The net effect is that the higher the level of orthoxylene, the worse the feed. This is illustrated by the following table which gives examples in which the feed was changed from the first to the second feed with the resulting change in product. In run A, with feed 1, the hours on catalyst were 135 whereas with feed 2, the hours on catalyst were 152. The pressure in run A was 230 p.s.i.g. at a temperature of 800° F., a v./v./hr. of 1.2, and a hydrogen to hydrocarbon mole ratio of 7.2. The same conditions prevailed in run B with the exception of hours on catalyst for feed 1 was 2159 and for feed 2 was 2170. In run C the pressure was 250 p.s.i.g., the temperature 750° F., the v./v./hr. 0.93, and the hydrogen to hydrocarbon mole ratio was 8.5. The hours on catalyst for feed 1 in run C was 576 and for feed 2 was 605 hours.

pressor 26 to the isomerization reactor 18 where it is again equilibrated with the formed $NH_3$ adsorbed on the catalyst. The formed $NH_3$ on the catalyst is depleted to the desired range of approximately 0–100 volume parts per million. After depletion of formed ammonia and removal of same from the system, hydrocarbon feed may be introduced in less than 16 hours after start of hydrogen treatment. The following conditions may be employed in removing ammonia during hydrogen treatment:

| | | |
|---|---|---|
| Hydrogen gas circulation rate (approx.) | s.c.f.h. | 1,000,000 |
| Water injection rate | gal./hr. | 750 |
| Reactor temperature | ° F. | 800 |
| Reactor pressure | p.s.i.g. | 400 |

Ammonia levels of over 2000 p.p.m. have been encountered when feed has been started after pretreating with high makeup and purge hydrogen rates which were reduced to acceptable levels by venting for extended periods of time over 16 hours. With water injection, however, in less than 16 hours after start of hydrogen treatment, the formed ammonia is reduced in accordance with this mode to 0.5 to about 3 p.p.m.

The nature and objects of the present invention having been completely described and illustrated and the best

EFFECT OF FEED COMPOSITION ON PRODUCT DISTRIBUTION

| | A | | | | B | | | | C | | | |
|---|---|---|---|---|---|---|---|---|---|---|---|---|
| | Feed 1 | Prod. 1 | Feed 2 | Prod. 2 | Feed 1 | Prod. 1 | Feed 2 | Prod. 2 | Feed 1 | Prod. 1 | Feed 2 | Prod. 2 |
| Run: | | | | | | | | | | | | |
| Nonaromatics | 1.0 | 1.4 | 0.1 | 0.8 | 0.1 | 0.6 | 0.2 | 0.6 | 0.3 | 0.5 | 0.2 | 0.5 |
| Benzene | | 0.2 | | 1.5 | | 0.8 | | 0.5 | | 0.5 | | 0.4 |
| Toluene | | 5.3 | 0.1 | 4.8 | 0.1 | 7.1 | | 1.9 | | 1.7 | | 1.7 |
| Ethylbenzene | 2.8 | 2.5 | 11.8 | 10.0 | 11.8 | 11.3 | 15.9 | 15.2 | 11.5 | 10.2 | 14.3 | 12.1 |
| Paraxylene | 2.2 | 19.0 | 9.4 | 18.4 | 9.4 | 16.6 | 11.9 | 19.1 | 10.0 | 19.7 | 10.8 | 19.5 |
| Metaxylene | 10.4 | 42.4 | 44.4 | 39.1 | 44.4 | 41.1 | 63.7 | 43.3 | 44.5 | 43.8 | 53.4 | 479 |
| Orthoxylene | 83.5 | 21.2 | 32.9 | 18.6 | 32.9 | 24.0 | 8.3 | 16.7 | 33.4 | 20.0 | 21.1 | 192 |
| $C_9$ | 0.1 | 6.8 | 1.3 | 5.7 | 1.3 | 3.0 | | 2.3 | 0.3 | 2.9 | 0.2 | 2.9 |
| $C_{10}$ | | 0.6 | 0 | 1.1 | 0 | 0.5 | | 0.5 | | 0.7 | | 0.8 |
| $K_x$ paraxylene | 2.3 | 23.0 | 10.8 | 24.1 | 10.8 | 20.3 | 14.2 | 24.1 | 11.4 | 23.6 | 12.7 | 23.9 |
| $K_x$ orthoxylene | 86.8 | 25.6 | 38.0 | 24.4 | 38.0 | 29.4 | 9.9 | 21.1 | 38.0 | 24.0 | 24.7 | 23.5 |

It will be seen that in each run, the greater the disparity of the $K_{x\ ortho}$ from equilibrium ($K_{x\ ortho}$=23.5), the more pronounced is the effect on $K_{x\ para}$ upon changing the feed. Also, the lower the content of orthoxylene is in the feed, the better the feed is to produce paraxylene.

As mentioned before, the present invention is applicable, not only to the xylenes, but also to the trimethyl and tetramethyl benzenes. To illustrate the equilibrium values ($K_x$) for the three xylenes, the three trimethylbenzenes, and the three tetramethylbenzenes, the data in the following table is given:

| | Equilibrium Values, $K_x$ | Operating T, ° F. | Mi T, ° F |
|---|---|---|---|
| p-Xylene | 24 | | |
| m-Xylene | 53 | | |
| o-Xylene | 23 | | |
| 1,2,4-trimethylbenzene | 63 | | |
| 1,3,5-trimethylbenzene | 28 | 625 | 570 |
| 1,2,3-trimethylbenzene | 9 | | |
| 1,2,4,5-tetramethylbenzene | 40.5 | | |
| 1,2,3,5-tetramethylbenzene | 50 | 570 | 500 |
| 1,2,3,4-tetramethylbenzene | 9.5 | | |

100–700 p.s.i.g., $H_2$/H.C. Ratio 2–20 Space Velocity 0.1–10 v./v./Hour

To illustrate the invention further, water is injected during the catalyst pretreatment step into the reactor effluent stream, such as 19 which is principally hydrogen accompanied by 10–15% of the usual hydrocarbon impurities—methane through pentanes—at a point preferably before the cooler-condenser 20 and after the reactor feed-effluent heat exchangers not shown. At this point the temperature is 250–450° F. which assures good contacting of the water (or steam) with the gas stream. The water is then condensed in the product and essentially all of the ammonia is removed. The liquid water is separated from the gas at the separator 22 and is drained to the sewer, while the gas is recycled through the compressor mode contemplated set forth what we wish to claim as new and useful and secure by Letters Patent is:

1. In an improved startup procedure for the isomerization of a polymethylbenzene feed in which said polymethylbenzene feed is contacted under isomerization conditions with a silica-alumina catalyst which has been impregnated with an aqueous solution of a soluble ammonia-molybdenum compound to provide a finished catalyst containing an isomerization-effective amount of $MoO_3$ on a dry basis, the method which comprises:
treating said impregnated catalyst with free hydrogen under conditions to decompose said molybdenum compound and form ammonia; and
removing at least a portion of said formed ammonia.

2. A method in accordance with claim 1 in which the ammonia is removed by contacting said hydrogen with a sufficient amount of water.

3. A method in accordance with claim 2 in which the amount of water is within the range of about 60 to about 3000 gallons per million cu. ft. of hydrogen per hour.

4. A method in accordance with claim 3 in which the amount of water is about 900 gallons per million cu. ft. of hydrogen per hour.

5. A method in accordance with claim 1 in which the ammonia is removed by venting at least a portion of said hydrogen.

6. A method in accordance with claim 1 in which the polymethylbenzene feed is present during said treating.

7. A method in accordance with claim 6 in which the ammonia is removed in the isomerized polymethylbenzene.

8. A method in accordance with claim 1 in which the soluble compound is ammonium molybdate.

9. A method in accordance with claim 1 in which said treating is for the time within the range from 4 to 24 hours at a pressure of at least 100 p.s.i.g.

10. A method in accordance with claim 9 in which the treatment in the presence of hydrogen is continued for up to 100 hours at a temperature not in excess of 850° F. after decomposition of said soluble compound and prior to isomerization of said polymethylbenzene.

11. A method in accordance with claim 1 in which a sufficient amount of ammonia is removed to provide from 0 to 100 p.p.m. of formed ammonia in the hydrogen.

12. A method in accordance with claim 1 in which:
(a) the ammonia is removed by contacting the hydrogen with a sufficient amount of water;
(b) the amount of water is within the range of about 60 to about 3000 gallons per million cu. ft. of hydrogen per hour;
(c) said treating is for a time within the range from about 4 to about 24 hours at a pressure of at least 100 p.s.i.g.; and
(d) the compound is ammonium molybdate.

13. In an improved startup procedure for the isomerization of a polymethylbenzene feed in which said polymethylbenzene feed is contacted under isomerization conditions with a silica-alumina catalyst which has been impregnated with an aqueous solution of a soluble ammonia-molybdenum compound to provide a finished catalyst containing an isomerization-effective amount of $MoO_3$ on a dry basis, and in which said impregnated catalyst has been dried at a temperature below 650° F., the method which comprises:
  treating said dried impregnated catalyst with free hydrogen at a temperature within the range from about 650° to 850° F. at a sufficient pressure to decompose said molybdenum compound and form ammonia; and
  removing at least a portion of said formed ammonia.

14. A method in accordance with claim 13 in which the ammonia is removed by contacting said hydrogen with a sufficient amount of water.

15. A method in accordance with claim 1 in which the impregnated catalyst is treated with hydrogen on a once-through basis.

16. A method in accordance with claim 13 in which the dried impregnated catalyst is treated with free hydrogen at a temperature within the range from about 725° to 850° F.

17. A method in accordance with claim 13 in which the hydrogen treatment is continued for up to 16 hours after removal of said formed ammonia.

18. A method in accordance with claim 13 in which the hydrogen treatment is at a pressure at least 100 p.s.i.g.

19. An improved startup procedure for isomerization of polymethylbenzene which comprises:
  hydrogen treating dried amorphous ammonium molybdate-containing silica-alumina catalyst while decomposing the ammonium molybdate;
  removing at least a part of the ammonia liberated from said catalyst by said hydrogen treating; and
  introducing polymethylbenzene feed into contact with said treated catalyst under isomerization conditions in less than 16 hours after start of said hydrogen treatment.

20. A method in accordance with claim 19 in which the ammonia is removed by contacting said hydrogen with a sufficient amount of water.

21. An improved startup procedure for isomerization of aromatic hydrocarbon which comprises:
  hydrogen treating ammonium molybdate-containing silica-alumina catalyst while decomposing the ammonium molybdate;
  removing at least a portion of the ammonia liberated from said catalyst by said hydrogen treating; and
  introducing aromatic hydrocarbon feed into contact with said treated catalyst in less than 16 hours after start of said hydrogen treatment.

References Cited

UNITED STATES PATENTS

| | | | |
|---|---|---|---|
| 2,784,241 | 3/1957 | Holm | 260—668 |
| 2,864,875 | 12/1958 | McKinley et al. | 260—668 |

DELBERT E. GANTZ, *Primary Examiner.*

CURTIS R. DAVIS, *Assistant Examiner.*